United States Patent [19]

Westlin et al.

[11] 4,135,900
[45] Jan. 23, 1979

[54] GAS FILTER DEVICE

[75] Inventors: Karl Westlin; Charles E. Rose, both of Louisville, Ky.

[73] Assignee: American Air Filter Company, Inc., Louisville, Ky.

[21] Appl. No.: 802,265

[22] Filed: May 31, 1977

[51] Int. Cl.$^2$ ............................................. B01D 46/40
[52] U.S. Cl. ................................. 55/499; 210/493 FR
[58] Field of Search ................. 55/497, 499, 501, 521, 55/498; 210/493 R, 493 FR

[56] References Cited

U.S. PATENT DOCUMENTS

| 2,082,481 | 6/1937 | Christofferson | 55/501 |
| 2,479,722 | 8/1949 | Brixius | 55/499 |
| 2,907,408 | 10/1959 | Engle et al. | 210/493 R |
| 2,915,426 | 12/1959 | Poelman | 55/521 |
| 3,177,637 | 4/1965 | Davis | 55/499 |
| 3,747,772 | 7/1973 | Brown | 55/501 |

Primary Examiner—Frank W. Lutter
Assistant Examiner—David L. Lacey
Attorney, Agent, or Firm—Jon C. Winger

[57] ABSTRACT

A gas filtering device of the type having a pleated filter media for filtering a gas stream passing through the media from the upstream side to the downstream side of the filter device, a peripheral frame surrounding and attached to the margin of the pleated filter media, a filter media reinforcing device comprised of an elongated rigid beam disposed within a pleat of the pleated filter media and extending the entire length of the pleat, and filter media retaining means attached to the rigid beam and extending across the downstream side of the filter media.

11 Claims, 10 Drawing Figures

GAS FILTER DEVICE

BACKGROUND OF THE INVENTION

The present invention pertains to gas separation devices and more particularly to the reinforcing of non-planar sheet form or zigzag filter media.

Gas filters of this type may be subjected to a pressure drop across the filter media, that is, from the upstream side to the downstream side relative to the direction of the flow of the gas stream. The force generated on the upstream face of the filter media resulting from the pressure drop causes the filter media to deflect or bow outwardly of the filter frame in a downstream direction. When this bowing or deflection becomes too great, the seal between the filter media and filter frame could be broken allowing dirty gas to pass therebetween.

In practice, it has been known for a source of gas in communication with a pleated filter to malfunction causing a gas stream to be generated of higher pressure than design conditions call for, resulting in the type of filter failure discussed above.

Therefore, a need exists for a gas filter of the pleated or zigzag type which can withstand high pressure drop from time to time without rupture of the filter media to filter frame connection.

SUMMARY OF THE INVENTION

The present invention recognizes this need and provides a solution which not only satisfies it, but which does not interfere with the passage of a gas stream through the media and therefore is not detrimental to filtration efficiency, and is straightforward and inexpensive to manufacture.

More particularly, the present invention provides, in a filter device of the type comprising a pleated filter media wherein alternating pleats open to the upstream and downstream sides of the filter device, and a peripheral frame surrounding and attached to the margin of the pleated filter media, the improvement of a filter media retaining device comprising:

at least one rigid elongated beam connected to the filter frame, disposed at least partially within a pleat of the pleated filter media and extending longitudinally of that pleat of the pleated filter media; and, filter media retaining means associated with the beam and disposed in juxtaposition to the downstream side of the filter media to keep the filter media from distorting in a downstream direction of the filter device.

BRIEF DESCRIPTION OF THE DRAWINGS

A better understanding of the present invention will be had upon reference to the following specification and to the accompanying drawings wherein like numerals refer to like parts throughout the several views, and in which.

DETAILED DESCRIPTION OF THE PREFERRED EMBODIMENT

Figure 1:
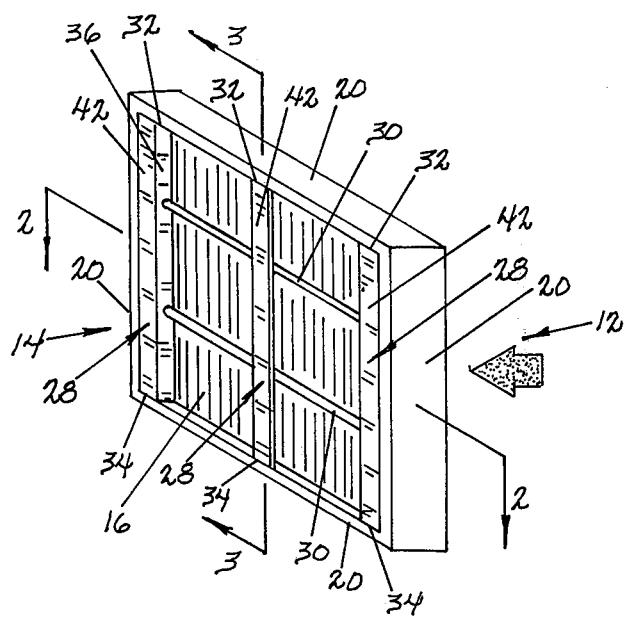
FIG. 1 is a perspective view of a filter device employing an advantageous embodiment of the present invention.
Figure 2:
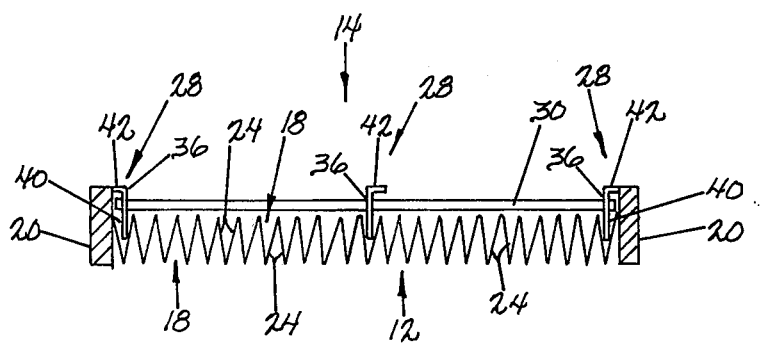
FIG. 2 is an enlarged sectional view taken along line 2—2 in FIG. 1.
Figure 3:
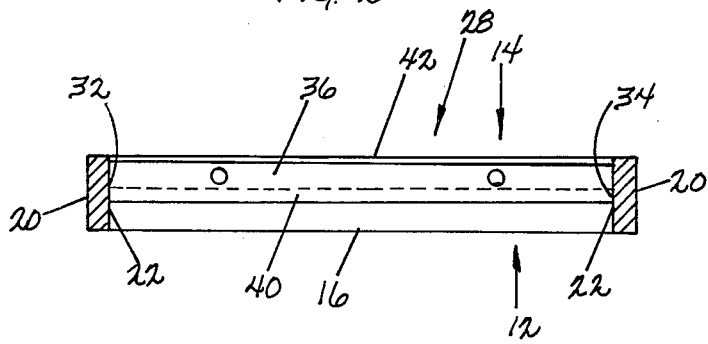
FIG. 3 is an enlarged sectional view taken along line 3—3 in FIG. 1.
Figure 4:
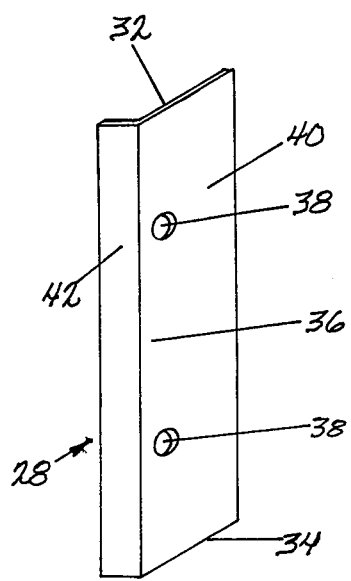
FIG. 4 is an enlarged but foreshortened perspective view of one element of the present invention.

FIGS. 1, 2 and 3 illustrate a gas filter device 10 having an upstream side 12 and a downstream side 14 relative to the direction of flow of a gas stream to be filtered which is indicated by the mottled arrow in FIG. 1. The filter device 10 is of the type comprising a pleated, or zigzag, filter media 16 wherein alternating pleats open, as generally denoted by the numerals 18, to the upstream side 12 and downstream side 14 of the filter device 10; and a generally rectangularly shaped peripheral frame 20 surrounding and attached to the margin 22 of the pleated filter media 16. The peripheral frame 20 can be attached to the filter media margin 22 by any one of a number of means, for example, by gluing.

Figure 5:
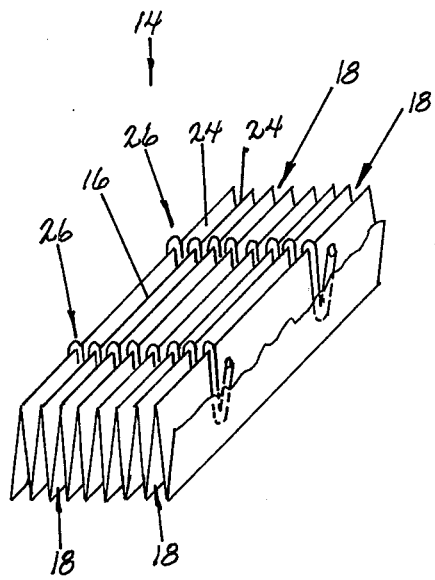
FIG. 5 is an enlarged perspective view of a segment of the pleated filter media used in the filter device of FIG. 1.

As can be seen in FIG. 5, gas filter devices of the type having pleated filter media usually employ pleat fold separators to space apart the adjacent flanks 24 of adjacent pleats so the pleats will not collapse. In FIG. 5, the pleat fold separators are depicted as strands 26 of material attached to the respective faces of the filter media. These strands 26 can be formed of any one of a number of man-made or natural materials such as, for example, a plastic bead, cotton cords, or strips of filter media similar to that used for the pleated filter media 16 itself. It should be understood that the above-described pleat fold separators 26 are mentioned by way of example and that there are other types known to industry.

At this point it should be mentioned that the pleat fold separators 26 are not depicted in FIGS. 1–3 and 6–10 because their inclusion would only serve to complicate the drawings and obscure the details of the present invention shown therein.

Now with reference to FIGS. 1–4, the filter device 10 also comprises at least three spaced apart parallel rigid elongated beams 28, each beam being at least partially disposed within a different one of the pleats open, as at 18, to the downstream side of the pleated filter media 16, and filter media retaining means such as two parallel spaced apart rods 30 which extend transversely to, intersect with and are connected to the beams 28. The filter media retaining rods are in spaced juxtaposition to and extend across the downstream face of the filter media 16.

Each rigid beam 28 extends the entire length of the pleat in which it is disposed and is attached at its opposite ends 32 and 34 to the filter frame 22. The beam ends 32, 34 can be attached to the filter frame by any one of a number of means such as, for example, clamps or gluing. Each beam 28 also projects outwardly of the pleated filter media 16 through the opening 18 of the pleat in which it is disposed as denoted by the numeral 36. The projecting portion 36 of each beam 28 has two appropriately spaced apart apertures 38 formed therethrough to receive the rods 30, thus, connecting the rods 30 to the beams 28. Preferably, each beam 28 is generally L-shaped in transverse cross-section, with the first leg 40 being disposed within the pleat of the pleated filter media 16 and the second leg 42 extending from the projecting portion 36 of the first leg 40. The L-shaped cross-section makes the beams more rigid.

As can be best seen in FIG. 2, each of the outermost two beams 28 are closely spaced from the portion of the filter frame 20 most adjacent thereto, and is oriented with the second leg 42 projecting toward the adjacent portion of the filter frame. Further, the sum of the distance between the first legs 40 of the two outermost beams and the distance by which the first leg 40 of one of these outermost beams is spaced from the filter frame adjacent to it is less than the length of the rod 30. The overall length of each rod 30 is also slightly less than the distance, across the filter media 16, between opposite sides of the filter frame 20. Thus, each rod 30 is caged in position across the downstream surface of the filter media.

The embodiment of FIGS. 1-3 is particularly useful in filter devices having a metal filter frame.

Figure 6:
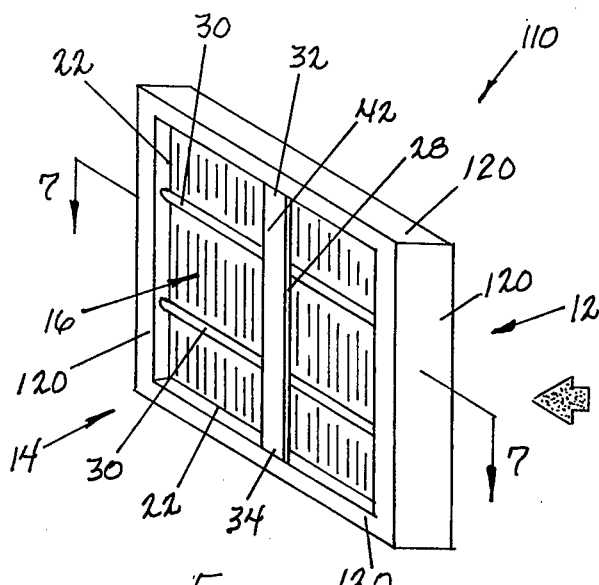
FIG. 6 is a perspective view of a filter device employing another advantageous embodiment of the present invention.
Figure 7:
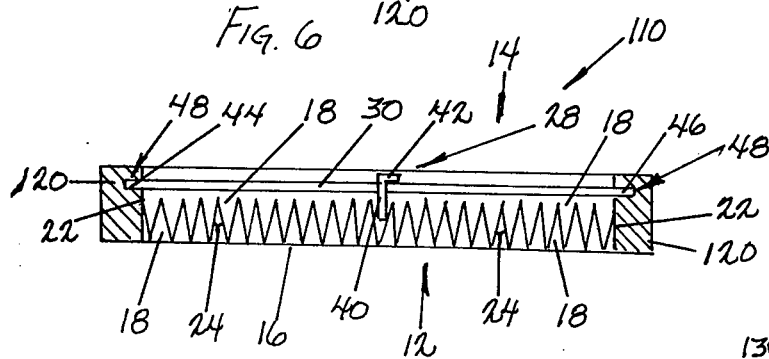
FIG. 7 is an enlarged sectional view taken along line 7—7 of FIG. 6.

Another advantageous embodiment of the present invention is illustrated in FIGS. 6 and 7 installed in a filter device 110. As with the filter device 10 of FIGS. 1-3, the filter device 110 has an upstream side 12 and a downstream side 14 relative to the direction of flow of a gas stream to be filtered which is indicated by the mottled arrow in FIG. 6. The filter device 110 is also of the type comprising a pleated, or zigzag filter media 16 wherein alternating pleats open, as denoted by the numerals 18, to the upstream side 12 and downstream side 14 of the filter device 110, and a generally rectangularly shaped peripheral frame 120, fabricated of, for example, wood surrounding and attached to the margin 22 of the pleated filter media 16. The peripheral frame 120 can be attached to the filter media margin 22 by any one of a number of means, for example, by gluing.

The filter device 110 also comprises at least one rigid elongated beam 28 disposed, at least partially, within one of the pleats of the pleated filter media 16 which is open, as at 18, to the downstream side 14 of the filter device 110, and filter media retaining means such as two parallel spaced apart rods 30 which extend transversely to, intersect with and are connected to the beam 28. The filter media retaining rods 30 are in spaced juxtaposition to and extend across the downstream face of the pleated filter media 16.

The rigid beam 28 extends the entire length of the pleat in which it is disposed and is attached at its opposite ends 32 and 34 to the filter frame 120 as by, for example, gluing. The rigid elongated beam 28 also projects outwardly of the pleated filter media 16 through the opening 18 of the pleat in which it is disposed as denoted by the numeral 36. The projecting portion 36 of the beam 28 has two spaced apart apertures 38 formed therethrough to receive the rods 30, thus, connecting the rods 30 to the beam 28. Preferably, the beam 28 is generally L-shaped in transverse cross-section with the first leg 40 being disposed within the pleat of the pleated filter media and the second leg 42 extending from the projecting portion 36 of the first leg 40. This L-shaped cross-section makes the beam 28 more rigid.

The opposite ends 44 and 46 of each rod 30 are received in appropriate holes 48 formed in the filter frame 120. The attachment of the rod ends 44 and 46 in the holes 48 in the filter frame 120 can be further assured by using an adhesive at the interface of the rod ends 44, 46 and the filter frame 120.

Figure 8:
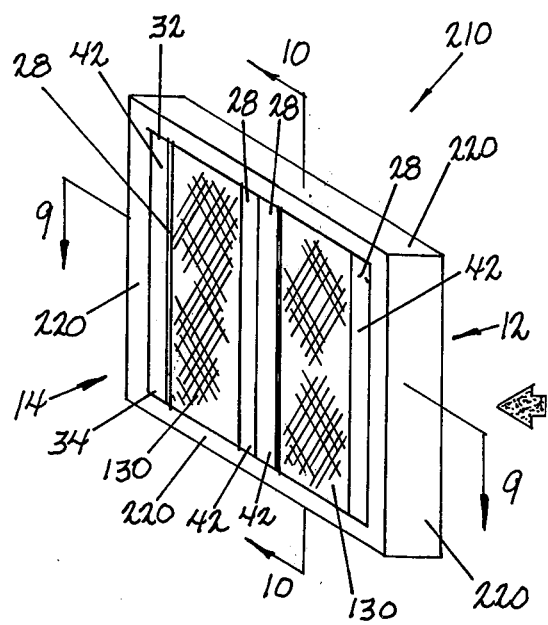
FIG. 8 is a perspective view of a filter device employing another advantageous embodiment of the present invention.
Figure 9:
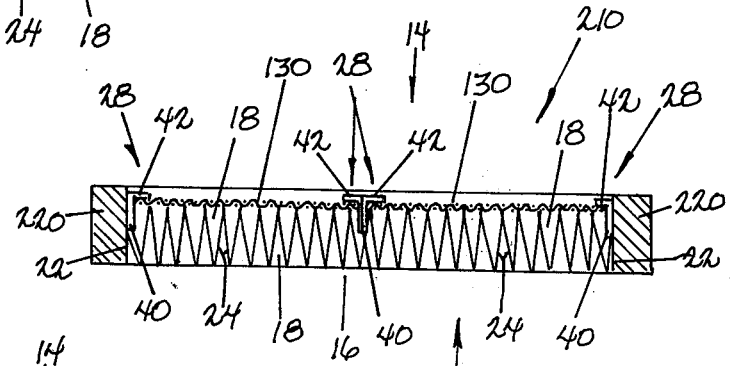
FIG. 9 is an enlarged sectional view taken along line 9—9 of FIG. 8.
Figure 10:
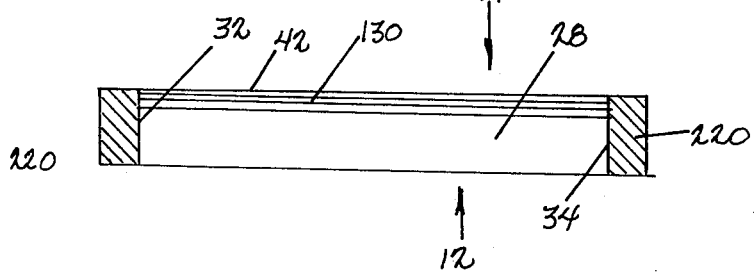
FIG. 10 is an enlarged sectional view taken along line 10—10 of FIG. 8.

FIGS. 8-10 illustrate another advantageous embodiment of the present invention installed in a filter device 210. As with the filter devices 10 and 110, the filter device 210 has an upstream side 12 and a downstream side 14 relative to the direction of flow of a gas stream to be filtered which is indicated by the mottled arrow in FIG. 8. The filter device 210 is also of the type comprising a pleated, or zigzag filter media 16 wherein alternating pleats open, as denoted by the numeral 18, to the upstream side 12 and downstream side 14 of the filter device 210, and a generally rectangularly shaped peripheral frame 220 surrounding and attached to the margin 22 of the pleated filter media 16. The peripheral frame 220 can be attached to the filter media margin 22 by any one of a number of means, for example, by gluing.

The filter device 210 also comprises a plurality of spaced apart parallel rigid beams 28 disposed, at least partially, in various pleats of the pleated filter media which are open, as at 18, to the downstream side 14 of the filter device 210, and filter media retaining means such as two planar reticulated sheets 130 which extend in juxtaposition to and over the downstream surfaces of the filter media 16.

Each rigid elongated beam 28 extends the entire length of the pleat in which it is disposed and is attached at its opposite ends 32 and 34 to the filter frame 220. The beam ends 32, 34 can be attached to the filter frame 220 by any one of a number of means such as, for example, by gluing. Each beam 28 also projects outwardly of the pleated filter media 16 through the opening 18 of the pleat in which it is disposed as denoted by the numeral 36. Preferably, each beam 28 is generally L-shaped in transverse cross-section with the first leg 40 being disposed within the pleat of the pleated filter media 16 and the second leg 42 extending from the projecting portion 36 of the first leg 40. The L-shaped cross-section has the dual function in this embodiment of making the beam more rigid and as means for holding the filter media retaining sheets 130 in place.

As can be best seen in FIGS. 8 and 9, each of the outermost two beams 28 are disposed with the first leg 40 in juxtaposition to the filter frame 220, and oriented with the second leg 42 projecting away from the filter frame toward the center of the filter media 16. Thus, the second legs 42 of the outermost two beams 28 project toward each other. In addition, the second leg 42 of each of the outermost two beams 28 are spaced from the downstream surface of the filter media 16 by a distance substantially equal to the thickness of the reticulated sheets 130.

The center two beams 28 are disposed in the same pleat of the pleated filter media in back-to-back relationship with each other. That is, the first legs 40 of these beams 28 are contiguous, and the second legs 42 project away from each other toward opposite ones of the outermost two beams. As with the outermost beams, the second legs 42 of these two center beams are also spaced from the downstream surface of the pleated filter media 16 by a distance substantially equal to the thickness of the reticulated sheets 130.

One reticulated sheet 130 is disposed over the downstream surface of the filter media 16 between one of the outermost beams and one of the center beams with one of its edges 50 sandwiched between the second leg 42 of that outermost beam and the filter media, and its opposite edge 52 sandwiched between the second leg 42 of that center beam and the filter media. Likewise, the other reticulated sheet 130 is disposed over the downstream surface of the filter media 16 between the other one of the outermost beams and the other one of the center beams with one of its edges 50 sandwiched between the second leg 42 of that outermost beam and the filter media, and its opposite edge 52 sandwiched between that second leg 42 of that center beam and the filter media.

In operation, the beam 28 and rods 30 and reticulated sheets 130 will limit the amount of deflection of the filter media 16 in a downstream direction thereby allowing the filter media to withstand large pressure drops which would otherwise cause structural failure of the media 16.

The foregoing detailed description is given primarily for clearness of understanding and no unnecessary limitations should be understood therefrom for modifications will be obvious to those skilled in the art upon reading this disclosure and may be made without departing from the spirit of the invention or scope of the appended claims.

I claim:

1. In a filter device comprising a pleated filter media wherein alternating pleats open to the upstream and downstream sides of the filter device, and a peripheral frame surrounding and attached to the margin of the pleated filter media, the improvement of a filter media retaining device comprising:

at least one rigid elongated beam connected to the filter frame at the opposite ends of the at least one beam, disposed within a pleat of the filter media and extending longitudinally within that pleat for the entire length of the pleat in which it is disposed, and having a portion which projects outwardly of that pleat; and, at least one rod extending transversely to and intersecting the at least one beam, the at least one rod being connected to the portion of the at least one beam projecting outwardly of the pleat at its intersection with the at least one beam, the at least one rod being attached to the filter frame at its opposite ends, and the at least one rod being disposed in spaced juxtaposition to the downstream side of the filter media to keep the filter media from distorting in a downstream direction of the filter device.

2. The filter device of claim 1 wherein the at least one beam is disposed in a pleat open to the downstream side of the filter device.

3. The filter device of claim 1 wherein the at least one beam is generally L-shaped in transverse cross-section, the first leg being disposed in the pleat with a portion projecting from the pleat, and the other leg extending from the projecting portion of the first leg.

4. The filter device of claim 3 wherein:
the projecting portion of the first leg of the L-shaped at least one beam has at least one aperture formed therethrough; and,
the transverse rod is received through the at least one aperture.

5. The filter device of claim 1, wherein:
the portion of the at least one beam projecting outwardly of the pleat has at least one aperture formed therethrough; and,
the at least one rod is received through the at least one aperture.

6. In a filter device comprising a pleated filter media wherein alternating pleats open to the upstream and downstream sides of the filter device, and a peripheral frame surrounding and attached to the margin of the pleated filter media, the improvement of a filter media retaining device comprising:

at least three parallel spaced apart rigid elongated beams, each beam being connected to the filter frame at the opposite ends of the beam, each beam being disposed within a different one of the pleats open to the downstream side of the pleated filter media and extending longitudinally within the pleat in which it is disposed for the entire length of the pleat, and each beam having a portion which projects outwardly of the pleat in which the beam is disposed; and, at least one filter media retaining rod extending transversely to and intersecting each of the at least three beams, the at least one rod being connected to the portion of each of the at least three beams projecting outwardly of the pleats at its point of intersection therewith, and the at least one filter media retaining rod being in spaced juxtaposition to the downstream side of the filter media to keep the filter media from distorting in a downstream direction of the filter device.

7. The filter device of claim 6, wherein:
the projecting portion of each of the at least three beams has at least one aperture formed therein; and,
the at least one filter media retaining rod is received through the at least one aperture in each of the at least three beams.

8. The filter device of claim 7 wherein the outermost two of the at least three beams are each closely spaced from the part of the filter frame adjacent thereto; and, the at least one filter media retaining rod is longer than the distance between the outermost two of the at least three beams.

9. The filter device of claim 7 wherein the length of the at least one filter media retaining rod is substantially equal to the width of the filter media in a direction transverse to the longitudinal axis of the pleats of the pleated filter media.

10. The filter device of claim 7 wherein each of the at least three beams is generally L-shaped in transverse cross-section, the first leg being disposed in the pleat with a portion projecting from the pleat, and the other leg extending from the projecting portion of the first leg.

11. The filter device of claim 10 wherein the other leg of each of the outermost two of the at least three beams extends toward the part of the filter frame adjacent to it.

* * * * *